B. J. MIESSNER.
DETECTOR FOR WIRELESS APPARATUS.
APPLICATION FILED OCT. 5, 1910.
1,104,065.
Patented July 21, 1914.
2 SHEETS—SHEET 1.
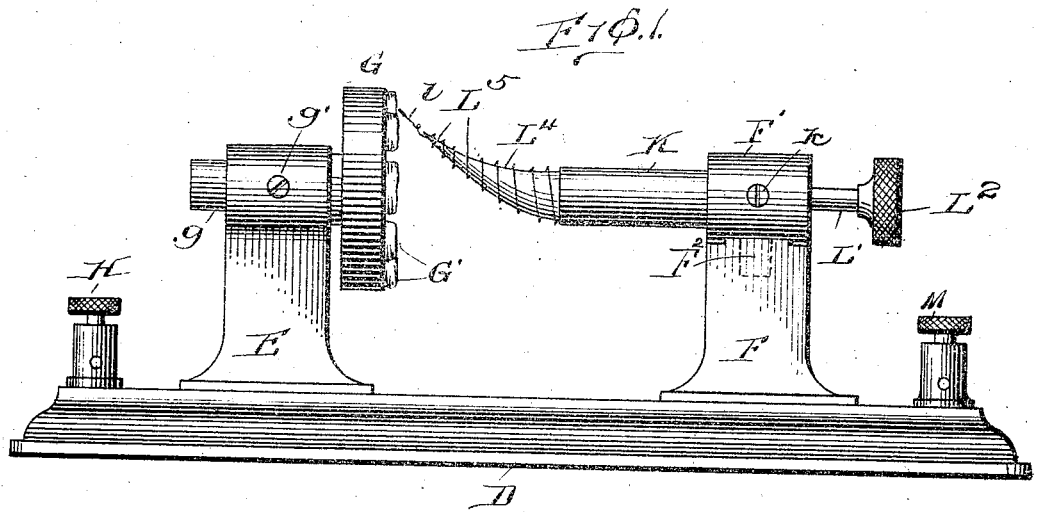
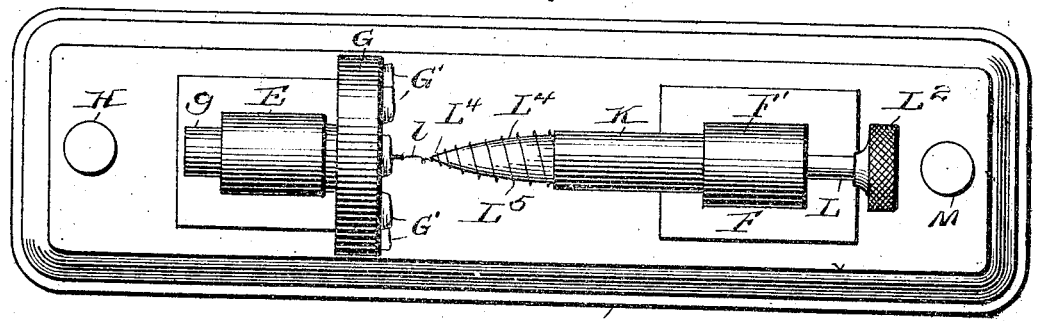

B. J. MIESSNER.
DETECTOR FOR WIRELESS APPARATUS.
APPLICATION FILED OCT. 5, 1910.
1,104,065.
Patented July 21, 1914.
2 SHEETS—SHEET 2.
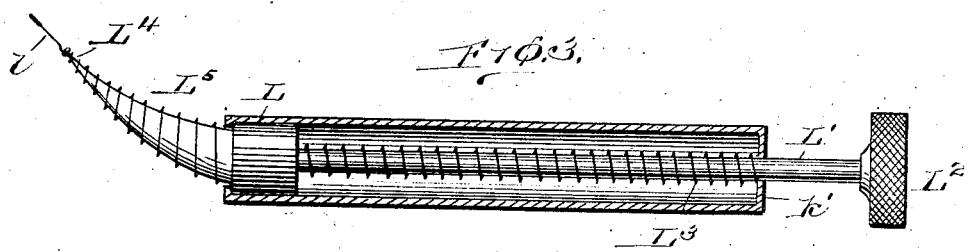
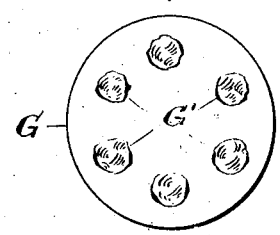
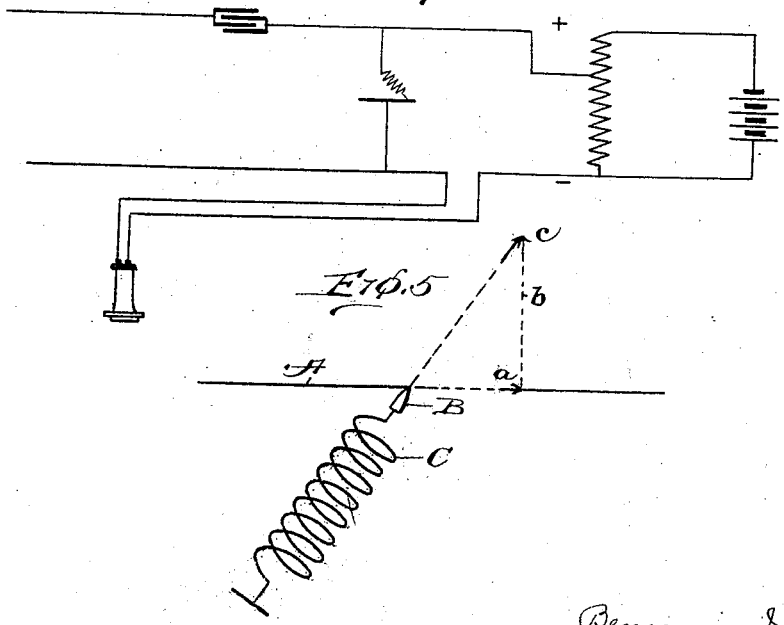

UNITED STATES PATENT OFFICE.

BENJAMIN J. MIESSNER, OF WASHINGTON, DISTRICT OF COLUMBIA.

DETECTOR FOR WIRELESS APPARATUS.

1,104,065.  Specification of Letters Patent.  Patented July 21, 1914.

Application filed October 5, 1910. Serial No. 585,484.

*To all whom it may concern:*

Be it known that I, BENJAMIN J. MIESSNER, a citizen of the United States, residing at Washington, in the District of Columbia, have invented certain new and useful Improvements in Detectors for Wireless Apparatus, of which the following is a specification.

My invention relates to improvements in detectors for wireless telegraphy apparatus.

The object of my invention is to provide a detector which will be sensitive in action, durable under the usual conditions of operation on land and sea and at the same time capable of holding its adjustment well.

I have found that a wireless detector comprising crystalline material as one contact and a fine metallic point touching said crystalline material with a very light pressure as the other contact forms a combination which is particularly sensitive in receiving the wireless signals. This is particularly the case when the contact device consists of iron pyrites and a very light spring having a sharp point in light but continuous contact with the iron pyrites. While it is not impossible to obtain the desired light pressure of the contact between the mineral and metallic contact devices by carrying the metal contact point on the end of a very light helical spring, yet a detector made merely in this way while having great advantages over previously known detectors as to sensitiveness to signals is too sensitive to mechanical vibrations for use on ship board or on land where such vibrations may occur. Therefore I have devised a particular method of mounting the metallic contact point so as to obtain the desired very light pressure of the contact devices without the employment of a spring so light as to be readily vibrated by the usual jars, shocks or other mechanical vibrations to which receiving apparatus is liable to be subjected in normal use. This novel construction constitutes an important feature of my invention, and broadly considered consists in so arranging a spring device carrying the metallic contact point that the yielding thrust of the spring on the said point will tend to urge said point in a direction at an incline to the plane of the general surface of the mineral contact device. A force acting in this manner on the point may be considered as resolved at the surface of contact into two components one of which is parallel to the plane of the surface of the mineral at the point of contact, and the other at right angles thereto. The first named component merely tends to force the metallic point along the plane of the surface of the mineral contact device, while the other component is resisted by the mineral device and thereby pressure of the contacts against each other is produced. The greater the angle of inclination of the line of thrust of the spring, the less the pressure between the contacts. Hence by this arrangement a very light pressure may be obtained with a relatively strong spring, whereby the spring will be less easily affected by mechanical vibration. It is true, of course, that when the mineral contact device consists of a fractured mass of crystals or crystalline material the fractured surface does not, strictly speaking, lie wholly in one plane. However, the deflections of the elemental portions of the fractured surface from the general plane of the whole material are usually not excessively great and therefore by making the inclination of the line of thrust of the spring about 45° to the general surface of the crystalline mass it will result in practice that such line of thrust will in almost every case be at sufficient incline to the plane of the elemental surface of the mineral contact device with which the metallic contact point engages. With this general introduction my invention will now be described more particularly in connection with the accompanying drawings in which:

Figure 1 is a side elevation of an apparatus embodying my invention; Fig. 2 a plan view of the same; Fig. 3 an enlarged detail view of one of the contact devices and its adjusting means; Fig. 4 is a diagrammatic view showing the preferred manner of connecting my detector in the oscillating circuit; Fig. 5 is a diagram intended to illustrate on a large scale a metallic contact point placed against a mineral contact device and explaining the resolutions of the thrusting force of the spring; and Fig. 6 is an end view of the detector disk.

Referring first to Fig. 5 let it be assumed that the line A indicates the surface of a crystalline or other mineral contact device, B a metallic point, and C a spring carrying said contact point and tending to press said point in the direction of the arrow $c$ with a force whose intensity is indicated by the length of said arrow. This force may then be resolved into two forces, namely a component parallel to the line A, whose intensity and direction are indicated by the arrow $a$, and a component at right angles to the line A whose direction and intensity are indicated by the arrow $b$. The latter component indicated by $b$ is the one which represents the pressure between the contact devices, and as will appear from the diagram is always less than the pressure of the spring indicated by the length of the arrow $c$. The other component tends to force the contact point in the direction of the arrow $a$ and is resisted by the friction between the two contact devices. If the component $a$ is greater than the frictional resistance the contact point will move in the direction of the arrow $a$ and thereby the spring will be bent or deflected laterally to an extent sufficient to produce a counteraction opposing the deflecting force. As the counteraction or reaction of the spring laterally increases with its deflection a point will soon be reached where the component acting in the direction of the arrow $a$ is in equilibrium with the reaction of said spring. This has the advantage of putting the spring under a slight tension in a direction at an angle to its line of thrust so that mechanical vibrations such as would be usually encountered on board ship cannot swing the spring laterally to break the contact between the contact point and the mineral contact device.

Referring now to Figs. 1, 2 and 3, D is the base plate, E and F suitable standards and G a rotatable disk, cup-shaped on one face, in which cup is secured a plurality of aggregated crystals or portions of iron pyrites, these crystals being held in the cup by a suitable material of a metallic nature such as tin or low-melting alloy, of the kind usually employed for this purpose, all pursuant to U. S. patent to Pickard, No. 877,451 of January 21, 1908. The disk G is provided with an axis $g$ passing through a hole in the upper end of the standard E and capable of being secured in said standard by means of a set screw $g'$. The disk G and its axis $g$ are of suitable conductive material and are in electrical connection with a binding post H which forms one of the terminals to which is connected the oscillating circuit. The standard F is provided at its upper end with an angularly adjustable head F′ having an opening through which passes a tube or cylinder K capable of adjustment axially in the standard F and arranged to be secured at any desired point by means of a set screw $k$. In order to permit the angular adjustment of the head F′ it is provided with a pin F² inserted in a hole in the upper part of the standard F.

The tube K has one end closed by a head $k'$ and within said tube is arranged a small piston L mounted on the end of a stem L′ which extends through the head $k'$ and is provided at its outer end with a milled hard rubber hand wheel L². The stem L′ within the tube K is surrounded by a helical spring L³ one end of which bears against the piston L and the other end against the head $k'$. The outer end of the piston L is provided with a conical nose L⁴ which has its extreme outer point eccentric to the piston L. Upon the nose L⁴ is secured a helico-spiral spring L⁵ which extends beyond the end of the nose and terminates in a straight portion $l$. This spring L⁵ fits somewhat loosely on the nose L⁴ and is secured at its inner end to said nose. The tube K, the piston L, the nose L⁴ and the spring L⁵ are of suitable conductive material, the spring L⁵ being preferably of spring brass wire about No. 30 gage. The axis of the tube K is in line with the axis of the disk G and the crystals of iron pyrites G′ are preferably arranged in a circle on the disk G. Owing to the eccentric arrangement of the end of the nose L⁴ a rotation of the piston L by means of the hand wheel L² will cause the free end of the straight portion $g$ of the spring L⁵ to move in a circle which is substantially of the same diameter as the circle of crystals. Furthermore, the straight portion $l$ of the spring L⁵ not only extends toward the crystals but also slopes outward at an incline. The spring L⁵ is in electrical communication with the binding post M which forms the second terminal of the device to which the oscillating circuit is connected.

While it is possible for a short time to employ a metallic contact point of any suitable metal I prefer to make the same of some extremely hard, good conducting, non-oxidizable metal or substance such as iridium, iridium-osmium alloy or platinum in order that it may not be oxidized by very strong sparks. The contact point may be attached to the spring in the usual way by hard soldering. I have found that it is of great importance that the surface of metal in contact with the crystal be very small and therefore the point should be very sharp. By rotating the disk G or the hand wheel L², or both, the contact points may be brought in contact with any desired one of the plurality of crystal masses or with any particular part of one of said masses. The manner of adjustment is as follows: The tube or cylinder being in line with the axis of the disk it is moved forward so that the contact point touches some one of the crystals with a slight pressure whereupon the set screw is tightened to hold it in this position. The point is then drawn back from the crystals by means of the hard rubber handle and the disk G may be rotated as desired to bring any crystal which it is desired to use into the desired position. The point is then swung either laterally or rotated as may be desired to bring it against said crystal or mass of crystals. Then by feeling about on different portions of the crystalline mass the most sensitive spot may be found by noting the intensity of incoming signals, or preferably the intensity of signals produced by a testing buzzer which is generally employed. I have found that when a slight external potential (.02 to .3 volt) is applied to the detector through the telephone the sensitiveness of the detector is materially increased. Furthermore the current should flow in the direction from the metallic contact point to the mineral contact device in order to secure the best results. The potentiometer should have a very fine graduation so that the potential may be adjusted very closely. This is highly important. It has been found by me that different points on the crystals usually require a different adjustment of the local battery potential in order to secure the best results. After a sensitive spot is found the potentiometer may be quickly adjusted. In practice I have found that the whole operation of adjusting the detector to a sensitive condition should not require more than half a minute.

I do not wish it to be understood that my improved detector is absolutely immune from injury by excessively strong electrical disturbances in the vicinity of the station but it will be entirely unaffected by any such disturbances which are not sufficient to make the operation of wireless apparatus dangerous. Signals from powerful stations within a distance of one mile and from ship stations within a few hundred feet and atmospheric discharges during which it is possible to communicate have practically no affect upon this detector. Furthermore it has been found under actual working conditions that this detector is far superior in this respect and equal in sensitiveness to all other detectors with which I am acquainted. Of the iron pyrite crystals some are unsuitable for use in this detector and therefore it is advisable in obtaining such crystals to test them for sensitiveness, then to select such as are sensitive, fracture them in order to have a fractured contact surface and test each of the portions before embedding it in the alloy in the cup. It has been found that when a detector is fitted with but one crystal and constantly subjected to very strong signals the crystal will in time become fatigued, for example, after half a day but if allowed to rest a day or longer such a fatigued crystal will usually again regain its former sensitiveness. It is for this reason that a plurality of crystals are embedded in the disk D. I have also found that it is advisable to make the spring by taking a piece of No. 30 gage brass or copper wire and flattening the said wire as by rolling the same, thus giving the wire a rectangular cross section. When the spring is formed in this way the straight portion $l$ is arranged so that the maximum diameter of the wire extends in a horizontal plane when the straight portion itself lies wholly in a vertical plane. In this way the straight portion is relatively stiff in a transverse direction and hence not easily affected by lateral mechanical vibrations. While the resilient contact-supporting means is thus of relatively very small mass, it has nevertheless sufficient stiffness to prevent its being unduly vibrated by disturbances to which it is exposed in practical use.

For tropical countries and where the atmosphere is extremely humid, it is advantageous to have the crystalline surface covered with a film of oil, in order to prevent short-circuiting or leakage.

Having thus fully described my invention, what I claim is:

1. A detector for wireless apparatus comprising two contact devices, one consisting of a sensitive contact member, and the other of a metal point, and resilient means of relatively very small mass for lightly pressing the metal point against the sensitive contact member in a direction at an incline to the plane of the contact surface of such sensitive contact member.

2. A detector for wireless apparatus comprising two contact devices, one consisting of a sensitive contact member and the other of a metal point, and a light spring carrying said metal point and arranged to press it against said sensitive contact member in a direction inclined to the general plane of the sensitive contact member contact surface.

3. A detector for wireless apparatus, comprising two contact devices, one of which is a crystalline sensitive contact member and the other a light spring contact point having a resilient straight portion contacting with and extending at an incline to the crystal surface.

4. A detector for wireless apparatus comprising two contact devices, one consisting of a sensitive contact member, and the other of a metal point, and resilient means carrying such metal point contact and arranged to press the same lightly against such sensitive contact member in a direction at an incline to the contact surface of said sensitive contact member, said resilient means permitting a limited lateral sliding movement of the metal point over the contact surface of such sensitive contact member.

In testimony whereof, I affix my signature in the presence of witnesses.

BENJAMIN J. MIESSNER.

Witnesses:
 JOHN H. SIGGERS,
 ALFRED M. HOUGHTON.